United States Patent [19]
Roth

[11] Patent Number: 6,160,547
[45] Date of Patent: *Dec. 12, 2000

[54] SHARED VIDEO DATA STORAGE SYSTEM WITH SEPARATE VIDEO DATA AND INFORMATION BUSES

[75] Inventor: Todd Roth, Shadow Hills, Calif.

[73] Assignee: ASC Audio Video Corporation, Burbank, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/542,440

[22] Filed: Oct. 12, 1995

[51] Int. Cl.$^7$ .............................. G06F 3/00; H04N 7/10; H04N 5/222; H04L 12/43
[52] U.S. Cl. ................................... 345/328; 348/6; 348/9; 348/722; 455/3.1; 370/461
[58] Field of Search ........... 395/200.09, 200.47–200.49, 395/894; 348/6, 7, 8, 10, 12, 13, 722, 9; 455/3.1, 4.1, 4.2, 5.1, 6.1, 6.2; 345/326, 327, 328; 370/450–452, 458–461; 709/217–219; H04N 7/10, 7/14, 7/16

[56] References Cited

U.S. PATENT DOCUMENTS

| | | |
|---|---|---|
| 4,792,849 | 12/1988 | McCalley et al. . |
| 4,829,372 | 5/1989 | McCalley et al. . |
| 4,920,432 | 4/1990 | Eggers et al. ............................ 348/7 X |
| 5,084,816 | 1/1992 | Boese et al. ............................ 395/575 |
| 5,191,611 | 3/1993 | Lang . |
| 5,262,875 | 11/1993 | Mincer et al. . |
| 5,307,456 | 4/1994 | MacKay . |
| 5,351,067 | 9/1994 | Lumelsky et al. . |
| 5,414,455 | 5/1995 | Hooper et al. . |
| 5,422,674 | 6/1995 | Hooper et al. ........................... 348/6 X |
| 5,426,699 | 6/1995 | Wunderlich et al. . |
| 5,539,448 | 7/1996 | Verhille et al. ......................... 348/7 X |
| 5,586,264 | 12/1996 | Belknap et al. ......................... 348/7 X |
| 5,654,747 | 8/1997 | Ottesen et al. ............................ 348/12 |

OTHER PUBLICATIONS

Andrew S. Tanenbaum, "Computer Networks", Published by Prentice Hall, 1988, pp. 148–153.

*Primary Examiner*—John W. Miller
*Attorney, Agent, or Firm*—Blakely, Sokoloff, Taylor & Zafman LLP

[57] ABSTRACT

A shared video data storage system eliminates the need for a costly dedicated server and high performance network connection in audio/video media delivery applications. Instead of stations requesting material from a server and waiting for the data to be delivered across the network from the storage devices via the server, the storage devices are connected locally to each station. Access is arbitrated locally over a low performance (and consequently lower cost) network and access is provided directly via the storage interface.

6 Claims, 3 Drawing Sheets

SHARED VIDEO DATA STORAGE SYSTEM WITH SEPARATE VIDEO DATA AND INFORMATION BUSES

BACKGROUND OF THE INVENTION

1. Field of the Invention

This invention relates to the general field of information storage and more particularly to a storage system for video data that is simultaneously accessible by multiple client stations.

2. Background

Magnetic disks have largely supplanted video tape as the storage medium of choice for many video production tasks. In many cases, it is desirable to have the capability for multiple production resources to simultaneously access a central video storage device. For example, consider the commercial insertion task of a local broadcast televisions station. A television program is received from a network feed or is played from a video tape. At appropriate times, the television station must insert commercial messages or other spot announcements. Before the advent of disk storage, each commercial would be recorded on a separate video tape cassette. Prior to a commercial break, the appropriate cassettes would be loaded into a bank of cassette players which would then be cued at the proper times by an editor or automatic player control system.

A disk-based video storage system permits the broadcast station to store all of the commercials and other spot insertions for random access. The appropriate sequence of commercials and other spots can then be easily retrieved for insertion during breaks in the broadcast program. It is desirable to have access to the disk-based video storage by various workstations and other components in the broadcast station. In order to provide such access capabilities, it has heretofore been necessary to couple the disk storage unit or units to a network file server. The server is typically a relatively expensive piece of hardware and creates a bottleneck for access to the stored video data. Individual client stations attempting to access video storage through the server must wait for any open transactions to be completed. This can create a serious problem due to the continuous nature of video data. One solution to this problem has been to provide local storage in the client stations; however, this means that each client station must have its own hard disk, thereby adding cost and complexity to the system.

The present invention eliminates the need for a costly dedicated server and high performance network connection in audio/video media delivery applications. Instead of client stations requesting material from a server and waiting for the data to be delivered across the network from the storage device(s) via the server, each client station is locally connected to the storage device(s). Access is arbitrated locally over a relatively low performance (and consequently lower cost) network without stealing bandwidth from the storage interface.

SUMMARY OF THE INVENTION

The present invention provides a shared data storage system for a plurality of client stations. A central storage device or array of devices is provided for bulk storage of data, such as audio video data. Each of the client stations is directly coupled to the storage device on a high bandwidth bus. Each of the client stations is also directly coupled to a separate information bus. A token granting access to the central storage device is passed from one client station to the next. Each client station is allocated a predetermined duration of storage access, thereby ensuring that the data requirements of each storage station are fully satisfied. Only a very modest amount of local storage is required in each client station to buffer the data transfers.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
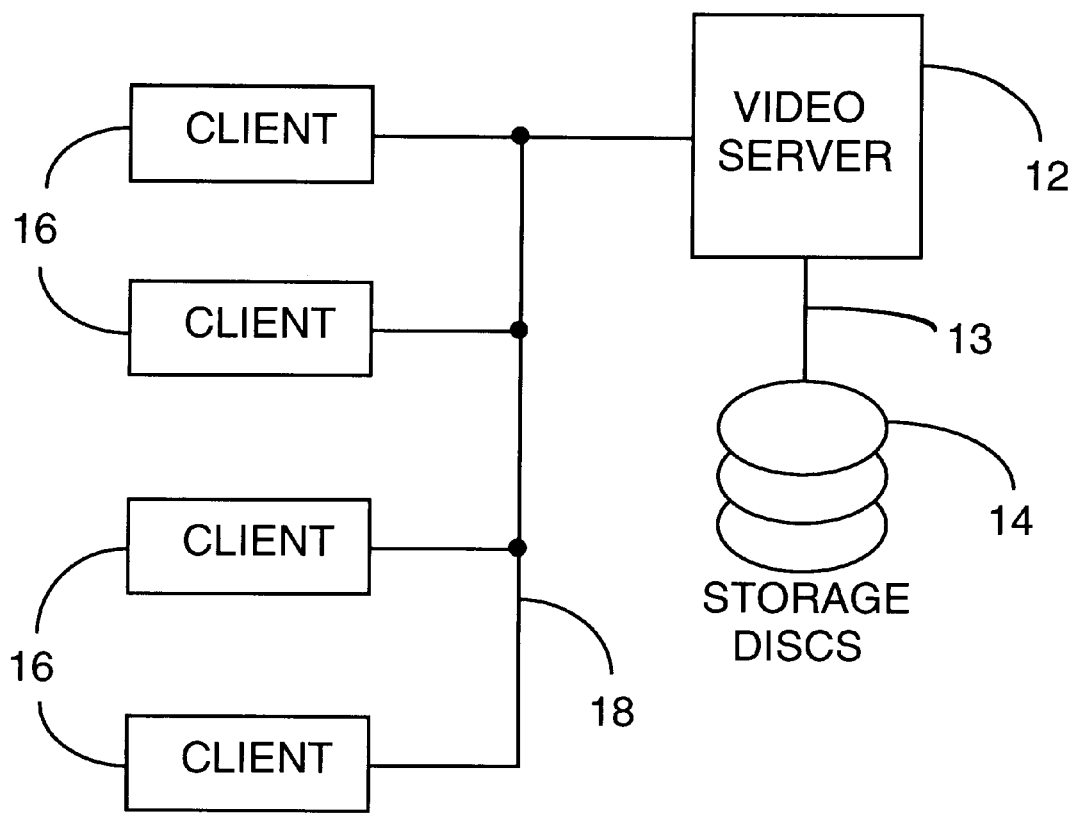
FIG. 1 is a functional block diagram of a prior art shared data storage system.

FIG. 1 is a functional block diagram illustrating a prior art video data storage system. A video server 12 has an associated video disc unit 14 on storage interface 13. A plurality of client stations 16 are coupled to the video server 12 on a network bus 18. A high performance network connection is necessary to handle the data rates associated with audio/video information. The available bandwidth of the system is limited to the lesser of the bandwidth of network bus 18 and storage interface 13. To the extent that network bus 18 is a limiting factor, the bandwidth available for video transfer is further reduced by other communications traffic on the bus, such as bus access requests and arbitration protocol. Due to network limitations, client stations 16 will frequently require local storage capability for data buffering. Such storage will usually be provided in the form of a hard disk, which increases the cost and complexity of the client stations.

Figure 2:
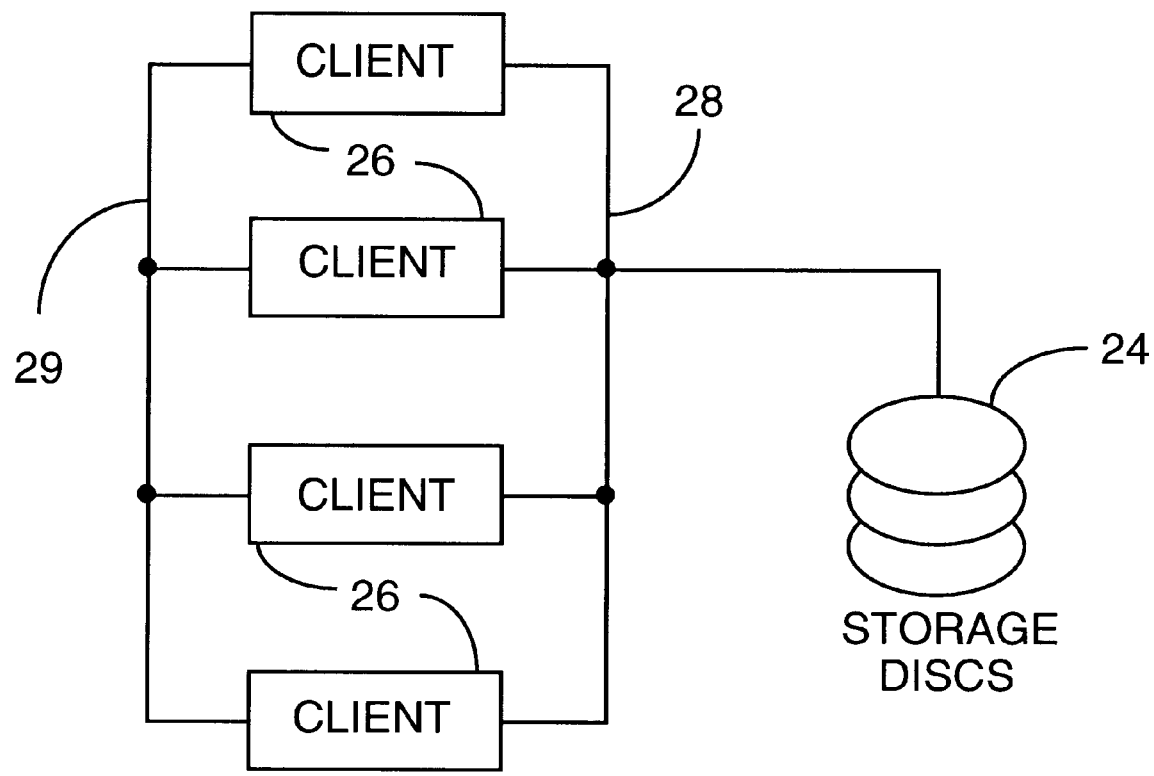
FIG. 2 is a functional block diagram of a shared data storage system according to the present invention.

Referring now to FIG. 2, a shared video data storage system in accordance with the present invention is illustrated. Video storage unit 24 is coupled directly to each of a plurality of client stations 26 on a high performance storage interface bus 28. Based on current technology, bus 28 is preferably a Small Computer System Interface (SCSI) type 2 interface, which has a nominal bandwidth (for an 8-bit bus) of 10 megabytes per second. Bus 28 may also be a Serial Storage Architecture (SSA) interface or a Fibernet interface. These new technologies offer up to 10 times the bandwidth of SCSI-2.

Client stations 26 are also each connected to a (relatively) low performance network bus 29. In a current embodiment of the present invention, bus 29 is an Ethernet interface having a bandwidth of approximately 10 megabits per second. Bus 29 handles all communications between the client servers, including arbitration of access to video storage unit 24.

It should be observed that no server is required to provide an interface between client stations 26 and video storage unit 24. Each of the client stations has direct access to the video storage. Access protocol is established in each of the client servers. In one embodiment of the invention, a token is passed from one client station to the next. While a client station retains the token, it has exclusive access across bus 28 to video storage unit 24. The access protocol specifies a predetermined dwell time on bus 28. At the expiration of the dwell time, the token must be passed to the next client station. The protocol includes time-out detection to detect failure of a client station and automatic reinitialization to bypass the failed unit.

Figure 3:
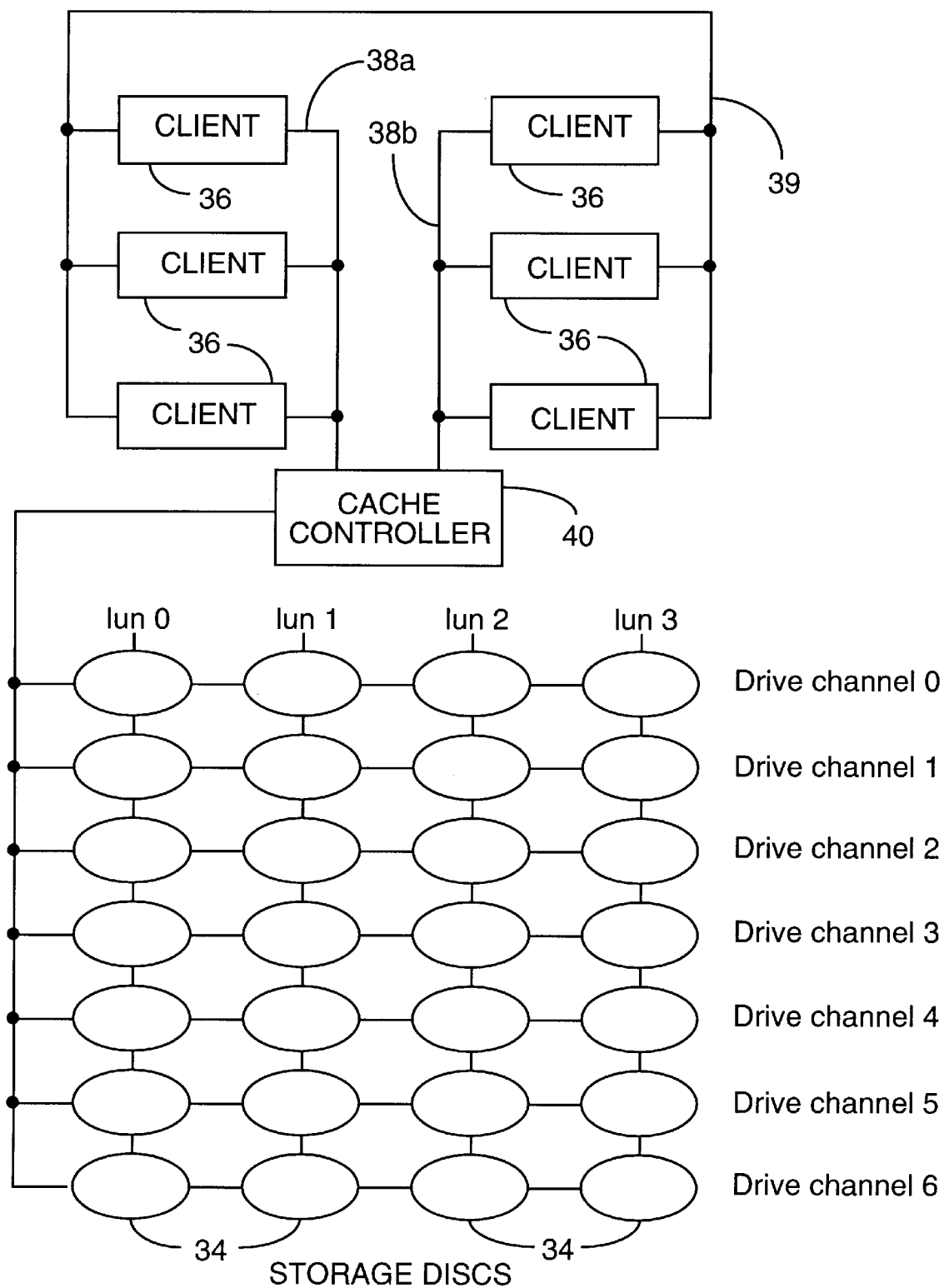
FIG. 3 is a functional block diagram providing a more detailed view of one embodiment of the present invention.

FIG. 3 illustrates a specific example of the present invention as embodied for a television broadcast station to provide simultaneous network delay, spot insertion and newsroom editing functions. In this embodiment, client stations 26 are Virtual Recorder® video disk system components manufactured by the assignee of this application. These are computer-based units that provide seamless read/write access to any selected video segment in the shared disk storage units 34. Among other tasks, stations 36 perform video compression/decompression and data buffering functions.

Stations 36 are coupled to cache controller 40 on dual SCSI interface buses 38a and 38b. Each SCSI bus is a fast, wide (16 bit) SCSI-2 interface with a bandwidth of 20 megabytes per second. Cache controller 40, based on a CMD CR5500 unit, supports up to 112 SCSI drives for video storage. In the illustrated embodiment, 28 9-gigabyte drives 34 are coupled to controller 40 in a 4 lun RAID level 3 configuration. Drive channel 0 functions as a parity check drive to permit reconstruction of stored data in the event of an individual drive failure.

Stations 36 are coupled to Ethernet bus 39. As previously discussed, access to the video storage is governed by a token passed between stations 36 over bus 39. In the illustrated embodiment, each of stations 36 has an effective available bandwidth of 6.67 megabytes per second, which is more than enough to support full motion video. Stations 36 have a relatively modest 8 megabytes of buffer storage partitioned into 3 segments of 2.67 megabytes each. Video data is transferred in or out of stations 36 in bursts of 2.67 megabytes.

Each of stations 36 maintains a local map of the contents of storage drives 34 on a frame-by-frame basis. Whenever data is written to drives 34, the Ethernet token is accompanied by a message specifying the starting sector of the recorded data, the number of sectors recorded, time code data, and user data.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A server-less shared video data storage system comprising:

a storage device for storing digital video data;

a plurality of client stations;

a digital video data transfer bus coupled to the storage device and each of the client stations such that all of the client stations have direct simultaneous random access to the digital video data;

an information data bus coupled to each of the client stations for transferring data between the client stations;

arbitration means distributed solely within the client stations for allocating access to the storage device among the client stations via the information data bus.

2. The system of claim 1 wherein the arbitration means comprises a token passed between the client stations over the information data bus.

3. The system of claim 1 wherein the information data bus is an Ethernet bus.

4. The system of claim 1 wherein the video data transfer bus is a SCSI bus.

5. The system of claim 1 wherein the storage device comprises a disk drive.

6. The system of claim 1 wherein the storage device comprises an array of disk drives.

* * * * *